United States Patent
Fleury (10) Patent No.: US 7,270,751 B2
(45) Date of Patent: Sep. 18, 2007

(54) METHOD FOR TREATMENT OF SEWAGE PLANT SLUDGES BY A FUNGAL PROCESS

(75) Inventor: Sylvie Fleury, Orphin (FR)

(73) Assignee: Societe d'Amenagement Urbain et Rural, Guyancourt (FR)

( * ) Notice: Subject to any disclaimer, the term of this patent is extended or adjusted under 35 U.S.C. 154(b) by 259 days.

(21) Appl. No.: 10/507,578

(22) PCT Filed: May 14, 2002

(86) PCT No.: PCT/FR02/01608

§ 371 (c)(1),
(2), (4) Date: Sep. 9, 2004

(87) PCT Pub. No.: WO03/076351

PCT Pub. Date: Sep. 18, 2003

(65) Prior Publication Data

US 2005/0115892 A1 Jun. 2, 2005

(30) Foreign Application Priority Data

Mar. 8, 2002 (FR) .................................. 02 02947
Apr. 26, 2002 (FR) .................................. 02 05277

(51) Int. Cl.
- C02F 11/02 (2006.01)
- C02F 3/34 (2006.01)
- C02F 1/72 (2006.01)

(52) U.S. Cl. ...................... 210/602; 210/613; 210/620; 210/629; 210/631; 210/198.1; 210/220; 210/259

(58) Field of Classification Search ................ 210/602, 210/631, 612, 613, 620, 629, 198.1, 252, 210/221.1, 259, 220; 435/454.1, 254.1
See application file for complete search history.

(56) References Cited

U.S. PATENT DOCUMENTS

| | | | |
|---|---|---|---|
| 3,362,905 A * | 1/1968 | Gleave | ........................ 210/610 |
| 4,293,333 A | 10/1981 | Drobot | |
| 4,559,305 A * | 12/1985 | Zajic et al. | .................. 435/243 |
| 4,816,158 A * | 3/1989 | Shimura et al. | ............ 210/610 |
| 5,698,028 A | 12/1997 | Higa | |
| 5,955,350 A | 9/1999 | Kayser | |

FOREIGN PATENT DOCUMENTS

| EP | 0607096 | 7/1994 |
|---|---|---|
| GB | 335682 | 10/1930 |

(Continued)

OTHER PUBLICATIONS

"In-vitro compatibility evaluation of fungal mixed culture for bioconversion of domestic wastewater sludge", Molla et al., World Journal of Microbiology and Biotechnology, vol. 17, No. 9, Dec. 2001, pp. 849-856.

"Chemical and Biological Leaching of Aluminum from Red Mud", Vachon P, et al., Environmental Science and Technology, vol. 28, No. 1, 1994, pp. 26-30, American Chemical Society.

Membrane bioreactors for municipal wastewater treatment, H. Husain and P. Cote, WQI Mar., Apr. 1999, 4 pages.

*Primary Examiner*—Fred G. Prince
(74) *Attorney, Agent, or Firm*—Blakely Sokoloff Taylor & Zafman (57) ABSTRACT

The invention relates to a method for treatment of predominantly urban sewage plant sludges, characterised in comprising a step for treatment of the sludges by microfungi.

28 Claims, 2 Drawing Sheets

FOREIGN PATENT DOCUMENTS

| | | | |
|---|---|---|---|
| JP | 62-27098 | * | 2/1987 |
| JP | 61230796 | | 3/1987 |
| JP | 8-206693 | * | 8/1996 |
| JP | 10128371 | | 5/1998 |
| JP | 10323700 | | 3/1999 |

* cited by examiner

FIGURE 1

PRIOR ART

FIGURE 2

METHOD FOR TREATMENT OF SEWAGE PLANT SLUDGES BY A FUNGAL PROCESS

The present patent application is a non-provisional application of International Application No. PCT/FR02/01608, filed May 14, 2002.

The invention concerns a method of biological treatment for reducing purification plant sludge and an installation implementing such a method. More especially the field under consideration is that of the treatment of mainly urban wastewater.

This method is particularly intended for the treatment of sludge coming from the treatment of such mainly "urban" effluents and whose regulated spreading on land requires treatment solutions without transfer of the pollution problem and within the context of respect for the ecosystems.

Various purification treatments of wastewater are already known. Typically, wastewater undergoes physical and/or chemical treatment (possibly in several stages) leading to the production of sludge. This sludge then undergoes activation by chemical and/or enzymatic means, or any analogous mechanism, and then possibly dehydration, centrifuging, drying (or similar) before being removed from the purification plant.

In particular, in order to reduce the volume of sludge generated in the wastewater treatment methods of the "activated sludge" or similar type, it is sought to encourage the catabolism of endogenous micro-organisms. This can be done by relying on the age of the sludge or else by coupling together methods combining cellular lysis with an aerobic ($CO_2$) or anaerobic ($CH_4$) biological treatment. Various anaerobic or aerobic (thermophilic or not) digestion methods are known. They use transforming biomasses consisting in a large part of bacteria, such as *Pseudomonas,* whose life cycle leads to the transformation of a fraction of the organic carbon in the sludge into gas ($CO_2$ or methane). The process is controlled by a sludge residence time which is a minimum but sufficiently long.

Other methods aim to limit the highly varied biomass found in the sludge: bacteria and algae in particular.

Despite the various known methods, the amount of sludge is often too large and the need remains to further reduce it very greatly. The known thermophilic anaerobic treatments give better results than the aerobic treatments but require complex installations.

The invention aims to overcome the drawbacks of the prior art.

The invention aims in particular to degrade a larger fraction of the organic matter in the sludge in a range going from 20% to 40% on average of the amount of Dry Matter (Organic Matter and Mineral Matter) in the sludge, in order to reduce the volume accordingly.

The invention can also aim furthermore to control the rate of this degradation, in order to optimise the rate of treatment of the effluents according to the constraints upstream and downstream of the installation.

The invention also aims for an overall saving in operating costs of a treatment and purification plant, since the costs of eliminating the residual sludge are increasing.

To that end, the object of the invention according to a first aspect is a method of treating mainly urban purification plant sludge, comprising a step of treating the sludge with microfungi.

The term microfungi refers to micro-organisms, as opposed to the higher fungi. It means both the notion of mycelium, which is the vegetative organ, and the spores. It furthermore means any lower fungus, used in sufficient quantity to contribute towards degradation of the sludge, this degradation being evaluated by appropriate techniques within the capability of persons skilled in the art. Thus the species cited later are to be considered as non-limiting examples, the invention covering the use of species whose sludge degradation activity is proved. In the following description, the term microfungus or mycelium will be used indiscriminately for the sake of simplicity.

In a preferred manner, species which can be selected by appropriate selection protocols as described later are included more particularly. This selection of strains which are then cultured facilitates the production in large quantity of a *mycelial* preparation active against the sludge. Once the strain selection has been performed, a preparation of at least one of these strains will be administered to the sludge to be treated.

Amongst the microfungi effective for degrading the sludge, certain species can be found in purification plant sludge. Endogenous microfungi are spoken of. But these microfungi are present in insufficient quantity in this sludge to degrade it sufficiently. And they are not established under conditions encouraging the metabolism mode sought for optimum degradation of the matter.

Certain species can also be obtained from other biological sources.

According to one implementation, the method comprises, in parallel with treatment of the sludge with the microfungi, continuous culture of the microfungi.

The time of treatment of the sludge with the microfungi is typically between 1 and 10 days, typically between 2 and 5 days. The flows of mycelium and of sludge to be treated are controlled in the installation accordingly.

It is carried out typically at a pH of the order of 5.5 to 9, at a temperature between 10° C. and 30° C. Slow agitation will be preferred, with an oxygenation of the order of 1 to 4 mg/l of dissolved oxygen.

According to one implementation, a single microfungus strain is used. According to another implementation, several different strains are combined, forming a *mycelial* mixture, possibly with a synergic effect.

According to preferred implementations, the microfungi are chosen from amongst the genera *PENICILLIUM, TRICHODERMA, PHOMA, MUCOR, FUSARIUM, GALACTOMYCES, ASPERGILLUS, BOTRYTIS, GEOMYCES* and their mixtures.

In particular, the following can be used from amongst the moulds: *PENICILLIUM roqueforti, PENICILLIUM camembertii, PENICILLIUM chrysogenum* (*notatum, meleagrinum, flavidomarginatum, rubens, chlorophaeum, camerunense, aromaticum, harmonense*), *PENICILLIUM atramentosum, TRICHODERMA viride, TRICHODERMA Koningii, TRICHODERMA reesei, MUCOR hiemalis, MUCOR mucedo, MUCOR racemosus, MUCOR circinelloides, MUCOR fuscus, MUCOR circinelloides, MUCOR racemosus, MUCOR plumbeus, GALACTOMYCES geotricum, ASPERGILLUS phoenicis, ASPERGILLUS niger, ASPERGILLUS ficuum, FUSARIUM equisetii, GEOTRICUM candidum, PHOMA glomerata, BOTRYTIS Cinerea, GEOMYCES pannorum* and their mixtures.

According to one embodiment, other selected non-mycelial micro-organisms can possibly be combined with the *mycelial*. component in order to live in synergy and develop the same functions. These micro-organisms are in particular bacteria, yeasts, protozoa and amoeba.

Amongst the yeasts, *Saccharomyces* yeasts can be used.

Amongst the bacteria, bacteria of the genus *Bacillus* can be used, and in particular *alicyclobacilli, paenibacilli, brevibacilli, aneurinibacilli* and *virgibacilli*. The following species of *Bacillus* can be used in particular: *subtilis, anthracis, cereus, licheniformis, megaterium, pumilus, sphaericus and thuringiensis*. Amongst the species of *thermophilic bacteria*, the following can be used in particular: *bacillus stearothermophilus, bacillus thermoglucosidasius* and *bacillus thermodenitrificans*.

*Halobacillus* bacteria such as *sporosarcina halophila* can also be used.

According to another embodiment, conversely, microfungi will be combined with at least one other microorganism producing an antibiotic agent. This is because the applicant has surprisingly noted the synergic effect on the degradation of sludge obtained by the combined use of antibiotic agents and microfungi. The antibiotic agents can be produced in situ or added before or at the same time as the microfungi. Such antibiotic agents can be supplied by certain species such as *Penicillium* (in particular *chrysogenum*) and *Aspergillus* or *Paecilomyces*. The interpretation offered lies in the bacterial activity inhibiting effect by the antibiotics to the benefit of the functioning of the *mycelial* population, which makes it possible to encourage the degradation of the matter. The *mycelial* metabolisms are thus strengthened in comparison with the bacterial metabolisms in the *mycelial* digestion tank (contact chamber described later).

Other antibiotic-producing species such as *streptomyces* can also be used. The antibiotic molecules are typically enzymes, and/or protein molecules, cyclic compounds, or fusidic acids.

According to implementation, use is made of such species capable of generating antibiotic molecules, which make it possible to encourage the establishment of the exogenous biomass to the detriment of the endogenous biomass, only in the start-up phase or selectively in the year of use. This is because these species assist the *mycelial* species to become well established, which makes it possible to optimise the organic matter degradation process.

According to one implementation, species producing antibiotic agents are used to encourage the establishment of *mycelial* species in the bioreactor in order to avoid contamination of the bioreactor.

According to another highly advantageous embodiment, oxidising agents will be combined with the microfungi. This is because the applicant has surprisingly noted the synergic effect on degradation of the sludge of the combined use of oxidising agents and microfungi.

The method will in that case comprise a step of treating the sludge with at least one oxidising agent, injected on-line or in a pretreatment tank. This oxidising treatment precedes the biological treatment with microfungi, and has a duration typically less than three hours, preferably of the order of 30 minutes.

Preferably, the oxidising agent comprises $H_2O_2$ and ferrous or ferric salts. Fenton's reagent or similar will be preferred. However other oxidants can be used such as TO COMPLETE.

Just as in the case of the use of antibiotics described previously, the use of such an oxidising agent makes it possible to create an imbalance in the populations present in the sludge and in the *mycelial* digestion tank in favor of the *mycelial* species, which makes it possible to increase their matter degradation work.

The applicant has in fact demonstrated that at a given dosage of Fenton's reagent (calculated as a function of the sludge concentration expressed in g/l of suspended matter), a pre-degradation reaction of the matter generates an easier accessibility to the substrate for the *mycelial* species present in the cocktail concerned.

The use of Fenton's reagent increases by 5% to 30% on average (sometimes more depending on the initial qualities of the sludge) the efficiency of degradation of the organic matter compared with the use solely of microfungi.

Ferrous salts or ferric salts can be used. The reagent is typically used at temperatures of the order of 10° C. to 40° C. The amount of reagent will be controlled in order to avoid too high a rise in temperature during the oxidising treatment.

The pH of the sludge treated with Fenton's reagent is typically of the order of 5 to 8, preferably of the order of 5.5 to 6.5. Typically a dose of 0.001 to 0.1 g $H_2O_2$/g suspended matter (suspended matter initially present in the feed of the *mycelial* digestion tank) and 0.0001 to 0.01 g $FeSO_4$/g suspended matter (initial suspended matter), preferably 0.01 g $H_2O_2$/g suspended matter combined with 0.001 g $FeSO_4$/g suspended matter, will be used. The laboratory $H_2O_2$ solution titrates at 50%, the industrial solution (per tonne) titrates at 30%; as for the iron sulphate, $FeSO_4$, this comes most often in the form of crystals sold commercially in solid form.

The applicant has demonstrated that Fenton's reagent used alone on the sludge without the *mycelial* cocktail added after the oxidising treatment has no effect at the natural pH and under the treatment conditions. The interpretation offered of the surprising synergic effect noted is, from a microbiological point of view, an inhibition of the bacterial metabolism, partial or total as the case may be, by the oxidant used, which creates a differential used by the *mycelial* species which have access to the substrate much more easily and freely.

According to one implementation, the culture of the microfungi is aerobic, and is carried out continuously in a bioreactor.

According to one implementation, the sludge is treated continuously. The treatment rate is a function on the one hand of the dry matter concentration of the sludge, and on the other hand of the pollution load. An estimate is made per 1000 inhabitant-equivalent block (with a dry matter/BOD5 ratio of the order of 0.8 to 1 being taken into account, this parameter varying according to the type of wastewater to be treated) of a rate variation of the order of 2 to 10 $m^3$/day/1000 IE.

According to a continuous mode of use, the microfungi are injected at a rate of the order of 0.01% to 10% of the volume of sludge to be treated per day, typically of the order of 2% to 5%. As will be seen, they are administered in the form of a culture in a liquid medium.

According to a mode of use in which the sludge is treated discontinuously, the microfungi are injected at the rate of a volume of 0.01% to 15%, typically of the order of 2% to 10%, of the volume of sludge to be treated per day.

By virtue of the invention, the amount of dry matter of the sludge treated with the microfungi is reduced by approximately 10% to 50%, typically by approximately 20% to 30%, compared with that of the untreated sludge. Depending oh the control parameters, this degradation can be greater.

According to another embodiment, the method of treatment with microfungi comprises a simultaneous step of membrane filtration of the sludge (effluents) treated with the microfungi.

According to another aspect, the invention concerns a method of treating mainly urban water in a purification plant, comprising the following successive steps:
- physical and/or biological treatment of the wastewater, leading to the production of sludge conveyed into at least one initial-treatment tank;
- if need be, activation of the sludge in said tank;
- if need be, clarification of the activated sludge;
- biological treatment with microfungi of at least some of the sludge, if need be activated, in at least one biological contact chamber situated downstream of the initial-treatment tank, using a method as described previously;
- if need be, removal of the sludge treated in the biological contact chamber.

According to another aspect, the invention concerns a method of treating mainly urban water in a purification plant, comprising the following successive steps:
- physical and/or biological treatment of the wastewater, leading to the production of sludge (effluents) conveyed into at least one mixed-treatment tank;
- if need be, activation of the sludge in said tank;
- biological treatment with microfungi and with the help of a membrane filtration system of at least some of the effluents, if need be activated, in the mixed-treatment tank, using a membrane method as described previously;

According to another aspect, the invention concerns an installation for treating mainly urban purification plant effluents, intended to implement such a method, comprising:
- an initial-treatment tank containing purification sludge;
- downstream of the initial-treatment tank, at least one biological contact chamber intended for the degradation of at least some of the sludge by the microfungi;
- in parallel with the biological contact chamber, a bioreactor for continuous microfungus culture.

According to another aspect, the invention concerns an installation for treating mainly urban purification plant effluents, intended to implement a method combining treatment with microfungi and membrane treatment, comprising:
- a mixed-treatment tank containing purification effluents to be treated, intended for the degradation of at least some of the sludge (effluents) by the microfungi, the mixed-treatment tank comprising a membrane filtration system;
- in parallel with the mixed-treatment tank, a bioreactor for continuous microfungus culture.

Typically, the bioreactor comprises:
- means of input of nutriments and of an inoculum to be cultivated;
- means of homogeneous distribution of the microfungi in the bioreactor;
- means of transferring cultivated microfungi to the contact chamber.

In the implementations with a *mycelial* digestion contact chamber, the latter comprises means of input of the microfungi, means of input of the sludge, agitation means, aeration means, means of removing the treated sludge, and preferably means of controlling the input and output flow rates of the sludge and microfungi, the pH and the temperature.

The contact chamber has a capacity adapted to the installation. The capacity is in particular a function of the residence time of the sludge to be treated. By way of example, for a residence time of the treated sludge of 5 days and a dry matter concentration of 6 to 20 g/l, the volume of the contact chamber varies from 10 to 40 $m^3$ per 1000 IE (inhabitant-equivalent) block.

The treatment can be biological or mixed (chemical and biological agents).

Typically in the implementations using antibiotics, species known for secreting antibiotic substances used within the contact chamber itself are combined in order to inhibit the bacterial population. This requires development and production of these same species within the bioreactor but also possibly, and in certain cases, in a parallel bioreactor. Samples will thus be prepared consisting of the degradation microfungi cocktail combined with the species which are to act as bacterial inhibitors.

In the implementations using oxidising agents, markedly better results are obtained when the microfungi are injected downstream of this oxidation. The interpretation offered is as follows. The purification plant sludge consists in the main of biomass. This native biomass is difficult to reach as it is and the effect of an oxidant makes it possible to partially degrade these constituent bacteria of the sludge. These bacteria molecules (destroyed native bacteria) constitute more accessible substrates for the microfungi species. Putting the sludge pretreated by oxidation into contact with the sludge in the contact chamber leads to an imbalance of the populations within the tank to the benefit of the microfungi.

Preferably, the oxidation takes place in a short time, of the order of 30 minutes, upstream of the contact chamber, which allows the *mycelial* species to:not be attacked. Use will be made of either an on-line injection while complying with an upstream residence time, or a tank with an average residence time of 30 minutes with agitation.

According to a variant, use will be made for example of an $H_2O_2$ storage tank, a storage tank for iron sulphate salts, and a tank for preparing the oxidising mixture. According to another variant, use will be made of dosages of oxidising reagent injected directly, with the help of appropriate pumps and controls.

According to the desired performance and the type of sludge to be treated, treatment solely with microfungi, or treatment with microfungi combined with an oxidising treatment and/or an antibiotic treatment can be chosen.

Figure 1:
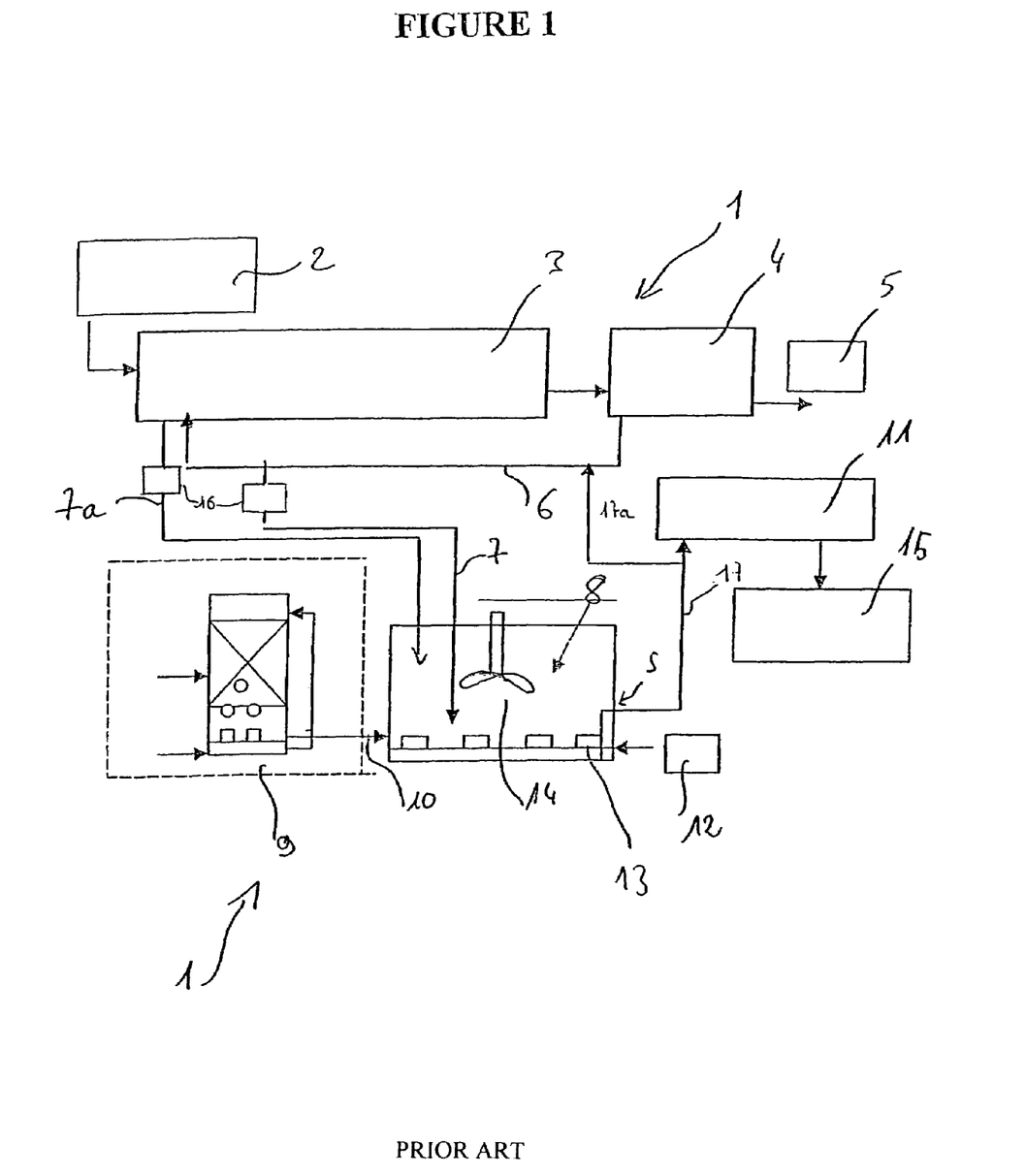
FIG. 1 is a schematic drawing showing a sludge treatment apparatus according to the prior art.

Other objects and advantages of the invention will emerge from a reading of the following detailed description, illustrated by FIG. 1.

A known installation 1 of the prior art comprises from upstream to downstream:
- a chamber 2 for storage and/or treatment of the water to be treated, in which mechanical and/or chemical pre-treatments may have taken place;
- downstream of this chamber 2, at least one sludge chamber or initial-treatment tank 3, the sludge not yet being exposed to the mycelia, and possibly being activated;
- downstream of this activated sludge chamber 3, a clarification or similar chamber 4, the clarified fraction leaving this chamber 4 being removed at the output 5 of the purification plant.

The sludge fraction at the output of the chamber 4 is taken back by transfer means 6 to the activated sludge chamber 3.

According to the invention, the installation 1 also comprises:
- a contact chamber 8 in which the mycelia are put into contact with the sludge which comes from the abstraction of the sludge recirculated by duct means 7, or possibly directly from the chamber 3 by duct means 7*a*;

a bioreactor 9 for culture of mycelia transferred by a pipe 10 to the contact chamber 8.

The sludge thus treated with the mycelia is removed from the chamber 8 to a sludge treatment and storage area 11. The sludge undergoes if need be a final treatment or else a combination of treatments (dehydration, centrifuging, drying, thermolysis, incineration) of the sludge (or other discharges) in a downstream area 15. The contact chamber 8 comprises an air intake 12.

When pretreatment of the sludge is provided, typically by means of at least one oxidising agent as described previously, the installation comprises a pretreatment tank 16 upstream of the contact chamber (or *mycelial* digestion tank) 8, and therefore positioned either on the sludge feed line 7 or else on the abstraction line 7a.

For the sake of clarity, a single element of the installation has been depicted at each stage. It should be understood that the numbers of each element are able to be adapted according to the dimensioning and type of installation.

The bioreactor 9 operates according to the principle analogous to the "trickle bed", using an ordered packing support. This bioreactor 9, which could be called a "*mycelial bed*", of small volume in a proportion ranging from $1/100^{th}$ to $1/50$th of the contact chamber 8, is used to cultivate the *mycelial* cocktail on an aerated support after having been selected for each type of sludge. The size of the bioreactor 9 is dependent on the flow to be treated but also on the quality and/or composition of the effluents to be treated. An appropriate quantity of *mycelial* preparation is transferred by means of the duct 10 into the contact tank 8. The *mycelial* preparation produced in the bioreactor 9 comprises spores and mycelia.

The volume of sludge treated in the contact chamber 8 corresponds to a residence time of several days; it is aerated and seeded with the spores and mycelium produced in situ, and stirred continuously using an agitator 14.

The treated sludge is possibly directed from the output S of the contact chamber 9 by a duct 17, to an aerated area 11, in order to prevent any risk of salting out of the phosphorus where dephosphatising by biological (or mixed) means was applied in the upstream system. In other cases, as the dimensioning volume has taken into account direct discharging into the dehydration system (or any other system) situated downstream, the pumping of the effluents is carried out directly without intermediate storage. It must be noted that the dimensioning of the downstream sludge system is decreased on account of the reduction in volume of the sludge, but also optimised by virtue of a better drainability of the sludge and a better aptitude for dehydration being obtained.

The operation of the system can take the two forms, continuous or batch. On an industrial site, continuous operation will be favoured in order to obtain smoothing of the matter degradation values and to encourage the conditions for development of the *mycelial* population. Batch operation can also find applications during seasonal operation.

In continuous operation, the method comprises a phase of pumping of the sludge extracted from the activated sludge system into the chamber 3, or to the recirculation 6, making it possible to feed the aerobic treatment phase in the contact chamber 8. This chamber 8 is in the form of a structure equipped with aeration diffusers 13 and, according to design, an agitation system 14. The aerobic biodigestion is fed continuously on the one hand with the sludge to be degraded coming from the sludge chamber 3 and on the other hand with the *mycelial* mixture which develops independently in the bioreactor 9.

The sludge (also designated effluent to be treated), whose recommended pH varies between 5.5 and 9, feeds this contact chamber 8 by pumping, with a moderate flow rate onto the recirculation, of the sludge from the aeration chamber, using a main pump and a booster pump in parallel. Filling of the contact chamber 8 is thus progressive, continuous and controlled whilst complying with a residence time in this chamber 8 of the effluent to be treated of 10 days maximum and 24 hours minimum.

According to the flows to be treated, with management of the storage volumes being taken into account, this duration can be increased, the efficiency of the method will be only very slightly furthered thereby and the additional time will not correspond to an economic optimum.

The contact chamber 8 is dimensioned by taking into account the residence time and the concentration of the sludge expressed in dry matter (g/l): this fixes a conventionally provided overall volume of the equipment necessary for its correct operation. This structure is aerated at the bottom of the chamber. Medium-bubble aeration diffusers or any similar system can be selected.

Syncopated homogenisation is possibly required according to the periods and type of effluents to be treated.

The contact chamber 8 contains a substantially constant *mycelial* population since the connected system of the type of the bioreactor 9 makes it possible to generate continuous populations at a limited growth rate.

A simple automation control known to persons skilled in the art makes it possible to act on both the aeration and the stirring.

Probes for control and/or indication of temperature, oxygenation and pH are desirable in order to check the correct stability of these parameters: pH possibly varying from 5.5 to 9, temperature from 10° C. to 30° C., slow agitation, oxygenation from 1 to 5 mg/l dissolved oxygen (in certain cases this parameter can be increased), residence time of approximately 5 days.

There is now described more precisely the bioreactor 9 for continuous mycelium production. Said bioreactor must be capable of supplying, to the microbial biomass it contains and which develops therein, the amount of oxygen it needs. It is a question of mixing three phases: an aqueous phase (the culture medium), a gaseous phase (the mycelium oxygenation gas, typically air), and a biotic phase constituted by the mainly *mycelial* microbial biomass.

The correct progress of the method is linked to the phenomena of transfers between the cells (mycelia and spores) and the culture medium. First of all it concerns transfer of matter, from the external medium to the cell as regards the substrate and the compounds of the culture medium necessary for cellular growth, and in the opposite direction for the metabolism products of the cells in culture. So that the transfers can take place correctly, the distribution of the cells in the culture medium must be the best possible. In aerobic culture of mycelia, it is the oxygenation gas which creates the turbulence and allows the cells to be kept in homogeneous suspension. The geometry of the bioreactor is designed so that the transfer of oxygen is the most efficient possible.

The supply of nutriments makes it possible to encourage the development of the microfungus micro-organisms and therefore exerts an influence on the kinetic behavior of the microbial population present.

So that the micro-organisms are distributed homogeneously and that the necessary oxygen is supplied and the temperature maintained, appropriate transfer means are used. As the microbial development continues, the cellular concentration increases, as does the concentration of products synthesised by the micro-organisms, whilst the medium becomes more impoverished in terms of substrate. The bioreactor 9 comprises typically, at the air intake, an air filtration system, intended to avoid contamination by undesired micro-organisms; yeasts in particular.

During the treatment of the sludge in the contact chamber 8, the Theological and chemical characteristics of the medium change, which leads to changes in functioning, the transfers no longer taking place in the same way. Action on the operating methods is therefore recommended in order to see to it that the microbial population is at all times under the best conditions and that its kinetic behavior is optimum within the contact chamber 8: agitation power, and/or air flow rate, and/or addition of substrates, perhaps even addition of reagents, and/or control of the temperature and of the pH (all these operations can easily be automated).

The contact chamber 8 is designed according to the type of process which is to take place therein. Irrespective of the micro-organism, the bioreactor 9 is designed to allow as good a contact as possible between the two phases, biotic and abiotic, of the system. The bioreactor establishes the steady state of the method described.

When the steady state is reached (maximum sludge reduction performance level), the regular supply of a sufficient amount of sludge (substrate for the flora) makes it possible to maintain the microbial population at a constant performance level. Obtaining a treatment plant operating as an industrial fermenter (biomass production), that is to say most often in chemostat mode (a culture in a replenished medium), guarantees the hardiness, simplicity and autonomy of the system.

Efficient treatment of the sludge in the contact chamber 8 is obtained using a supply of microfungi, produced in situ in the bioreactor 9, in the chamber 8, and/or recirculation of sludge having already resided in the contact chamber 8. The choice depends in particular on the type of effluents to be treated. According to one implementation, treatment with microfungi is performed with recirculation to the water system: sludge treated with the microfungi is removed from the output S, follows the duct 17 and then a duct 17a in order to come back to the duct 6.

In order to overcome "random accidents" (uncontrollable or unforeseen variations in the sludge), the concept of bioaugmentation is integrated into the method. Use will preferably be made of a culture and/or injection system in order to continuously supply a high charge of micro-organisms. This culture is performed in the bioreactor 9 using selected microbial products (strain inoculum and its culture medium based on extract of malt, starch, etc.) and specific nutriments (source of carbon, nitrogen, etc.) for amplification of the inoculum.

According to one implementation, biocatalysts can be automatically supplied repetitively during the process. In this case, sludge charged with microfungi (application of the inoculation on the first day) itself serves as an inoculum. However, in certain cases, in view of the richness and natural complexity of the sludge in terms of micro-organisms, the microfungus cultures might not be sufficiently specific (anarchic development in the presence of nutriments of a non-specific and non-repetitive flora). Use will then preferably be made of a mixture between a flora of selected "exogenous" fungi and another "endogenous" flora amplified and controlled by the nutriments. The method then makes it possible to continuously overdose the "active substance" and to maintain the technical performance despite variations in the flow or composition of the sludge.

The bioreactor 9, allowing production on site and/or continuous injection of micro-organisms into the contact chamber 8, allows permanent and optimum colonisation of the sludge. Compared with the definition of the chemostat mode which involves a single inoculation on the first day and then self-sufficiency, it is additional security.

At the start-up of the installation, the system is seeded with a cocktail selected and adapted to the type of effluent to be degraded. This step allows the installation to be started since it generates the autonomous operation of the whole.

The bioreactor 9 can come in very varied forms, such as a cylindrical column, of variable height according to the dimensioning flows: air, surface of the contact packing. It comprises for example three parts: a bottom part allowing collection of a liquid charged with mycelium, pumped and then poured back into the top part of the column which forms a spray system (sprinkler bar designed in such a way that the mycelia are not broken up). The central part contains a packing of structured or some other type, making it possible to optimise the establishment of the cultivated population, its fixing and its development under favourable conditions. This packing can be of different types and different materials, the main thing being to allow the fixing of the mycelia.

This sprinkling generated by recirculation of the liquid (via a pump) allows it to trickle over the packing of the tower and thus moistens the mycelia which adsorb the components of the liquid.

This bioreactor 9, with a capacity of the order of a few litres or tens of litres according to the size of the installation, is topped by a roof type cover allowing free passage of the air flow but guarding against rainfall.

Exchanges are encouraged by a counter-current between the air and the concentrated liquid percolating on the packing. Injection of the flow via the matter degradation chamber is carried out preferably by gravity or, failing that, the pumping technology makes it possible to keep the injected micro-organisms in a favourable metabolism. Thermoregulation may be necessary where the bioreactor 9 is not protected from frost.

The bioreactor 9 is designed so as to obtain a very limited consumption of inoculum to be established, on account of the autonomy of the system which operates with continuous recirculation, this recirculation providing optimum contact for the *mycelial* population with the constituents encouraging its development. The temperature therein is typically of the order of 10° C. to 30° C.

A selective biological analytical monitoring makes it possible to check the growth of the different species of mycelia constituting the selected cocktail.

A chemical analytical monitoring existing on the treatment plants makes it possible to assess the situation as regards the performance of the system. The degradation time is predefined according to the initial characteristics but can vary according to the variations in flow treated upstream. It is a system which fits this kind of fluctuation perfectly: the analytical monitoring makes it possible to make sure of good degradation efficiency.

According to a variant, the method of treatment by *mycelial* means can be put in place with recirculation on the activated sludge, that is to the water treatment system. The method is analogous to that described as regards both design and dimensioning. Nevertheless, the ranges of variation in the flow rates, residence times and volume of the contact chamber are different and generate optimisations laying down selection criteria for the different structures. The

*mycelial* selection is the same and can even benefit from synergies between the bacterial and *mycelial* flora.

In implementations using an oxidant such as Fenton's reagent, this oxidant is typically injected into the pretreatment tank 16 or on-line according to implementation and the residence times adopted on the links 7 or 7a.

Figure 2:
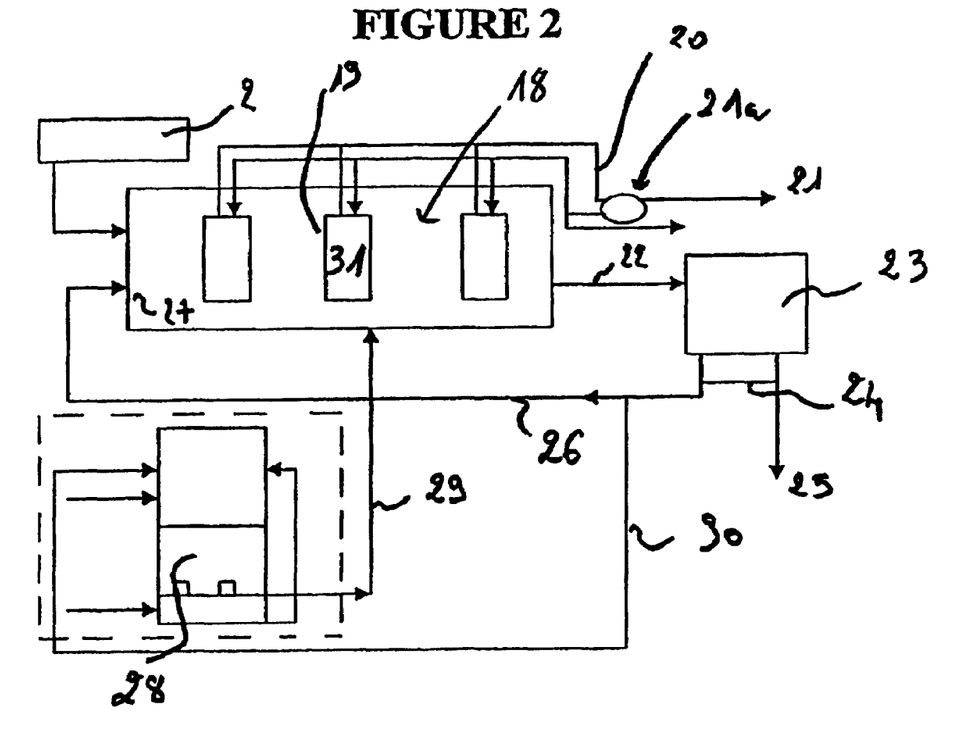
FIG. 2 is a schematic drawing showing a sludge treatment apparatus according to the present invention.

There is now described another embodiment of the invention involving a method of membrane filtration of the sludge treated with the microfungi.

In this membrane method illustrated by FIG. 2, the installation 1 does not comprise a contact chamber or *mycelial* digestion tank 8: digestion of the sludge by microfungi takes place directly in a pretreatment chamber 18 in which filtration means 19 are immersed. This chamber 18 is analogous to the chamber 3 described previously but contains in addition the filtration means 19.

In this chamber 18 designated a mixed-treatment chamber, combining treatment with microfungi and membrane filtration, the sludge is activated if need be; the chamber 18 is aerobic.

The treated water coming from the filtration means 19 is removed by a duct 20 to an output 21; the submersion water pressure of the module, sustained by a downstream suction pump, allows the passage of the treated water through the membranes. The water is expelled directly or is even potentially usable for recycling. This is because the membrane walls make it possible to dispense with a clarification step and the quality of the water is optimised. A backwashing system 21a can also be provided.

The sludge coming from the tank 18 is removed by a duct 22 to a sludge system 23 for example a dehydration system.

At the output of the system 23, the installation can comprise means 24 of separating the extracted sludge. The sludge can be removed by an output 25 or can recirculate by means 26 for circulating the filtrate to the input 27 of the mixed-treatment tank 18.

Just as in the embodiment described previously, the installation comprises a bioreactor 28 analogous to the bioreactor 9 described previously.

The microfungi produced in the bioreactor 28 are taken to the mixed-treatment tank 18 by a duct 29.

If need be, some of the filtrate coming from the duct 26 can be conveyed by a duct 30 to the input of the bioreactor 28.

The membrane-based filtration means 19 are typically in the form of one or more modules 31 immersed in the mixed-treatment tank 18.

The method combines a biological treatment of the wastewater by activated sludge at a high suspended matter concentration with a separation of the biomass from the treated water by the membranes. The membrane modules 31 can comprise aeration at their base intended to provide, on the one hand, the supply of oxygen necessary for the correct development of the biomass (air necessary for aeration of the sludge: required time of contact with the oxygen for oxygenation of the mixed bacterial and *mycelial* culture) and, on the other hand, the passage of the mixed liquor through the membrane fabric. This large-bubble aeration system can sometimes be combined with an additional fine-bubble system in order to satisfy the requirements.

An adapted backpressure system can be used to allow selective cleaning of the membranes. A backwashing system can also allow this cleaning. The permeability of the membranes provides retention of the suspended matter as well as the majority of the bacteria and germs. Use can be made for example of hydrophilic hollow fibre membranes having a permeability of the order of 0.1 to 0.4 µm. The total energy requirement of the method is of the order of 2 to 3 kWh/m$^3$ of permeate. The specific throughput is of the order of 0.4 to 0.5 m$^3$ per m$^2$/day.

By virtue of such an installation allowing the *mycelial* species to work in situ in the water system, the -combination of a method of treatment with microfungi and a membrane method makes the treatment conditions optimum.

Several advantages are noted:

- those of the membrane method (optimised water quality; absence of clarification (large structures));
- in this method, the sludge concentration (in terms of suspended matter, dry volatile matter, etc) is greater than that conventionally encountered in the activated sludge system alone. This concentration is favourable for the *mycelial* method;
- by virtue of the coupling of the method, there is no longer a "*mycelial* tank" since the *mycelial* digestion is carried out directly in the activated sludge.

The method for reducing the sludge volume is compact and optimised.

The membrane method, per se, is described for example in documents such as *Membrane bioreactors for municipal wastewater treatment*—Husain et al—WQI March/April 1999.

But the coupling of treatment with microfungi and a membrane method optimises and improves the treatment still further. Furthermore, as the membranes constitute a support for the micro-organisms during the air cleaning, the film formed is not totally detached from the membrane fabric, which is an advantage. In fact the selected *mycelial* cocktail develops and degrades the organic matter independently of this "intimate contact" created by the membrane between the sludge and the *mycelial* strains themselves constituents of the sludge.

Nevertheless, this contact film speeds up the degradation reaction. In addition, certain species of fungus with specific natures make it possible to purify any parasites. This method also advantageously allows recirculation of the filtrate either into the chamber 18 or into the bioreactor 28 according to application: in this filtrate, species are also preserved and recycled.

Furthermore, the *mycelial* cocktail can be selected according to the texture of the membrane. In fact, from amongst the species cited in the first patent, selection will be made of a suitable cocktail which will encourage species development, always according to a catabolic mode, which will not damage the membrane fabrics. The work criteria on the membranes remain the same; the work rate is very different according to installation, on average 20 to 30 l/m$^2$/h for membranes produced in sheet form for example.

There are now described more precisely the microfungus strains which can be used in the methods described previously (treatment with microfungi, coupled treatment with microfungi/membrane method or else a combination of oxidant pretreatment upstream of the *mycelial* treatment). Non-pathogenic strains are concerned of course.

The inventor isolated various strains of microfungus fungi in sludge from several purification plants using appropriate techniques. The following culture mediums, GSC and PDA, conventionally used for laboratory titrations, were used for isolation, qualification and quantification of the microbial populations present in samples of sludge from these purification plants:

| GSC - Sabouraud Agar with Chloramphenicol | | PDA - Potato Dextrose Agar | |
| --- | --- | --- | --- |
| Peptidic meat peptone | 10 g/l | Potato extract | 4 g/l |
| Glucose | 20 g/l | Glucose | 20 g/l |
| Chloramphenicol (antibiotic) | 0.5 g/l | Bacteriological agar | 15 g/l |
| Bacteriological agar | 15 g/l | | |
| pH = 5.7 | | pH = 3.5 to 4.5 according to use (adjust the pH by adding acid) | |
| Medium encouraging the growth of moulds (more selective than PDA) | | | |
| Mix 45.5 g of medium with 1 liter of distilled water | | Mix 39.0 g of medium with 1 liter of distilled water | |

These mediums are sterilised by heating at 120° C. for 15 minutes before use. They are solid at ambient temperature.

Isolation and quantification of the *mycelial* populations present in the purification plant sludge were carried out by means of an enumeration technique by culture on Petri dishes, a method referred to as Colony-Forming Units (CFU) or Selection by Depletion. The samples are taken at the recirculation circuit of the activated sludge chambers.

This technique consists of seeding aliquot parts of suspensions/dilutions, produced from the sample to be analysed, in or on a sterile culture medium suitable for the micro-organisms to be evaluated.

Isolation of the strains is performed in three stages. An incubation period of five to seven days is necessary between each of them.

First Isolation Phase:

The population to be studied underwent dilutions by factors of ten (from $10^{-1}$ to $10^{-7}$)

At each dilution, 0.1 ml of solution was abstracted, and then spread on the surface of a solid agar-based medium in a Petri dish (spreading out was ensured with a sterile disposable loop). For each dilution, two distinct solid mediums are seeded: GSC (Sabouraud Agar with Chloramphenicol) and PDA (Potato Dextrose Agar). The latter medium is less selective and more favourable to bacterial growth. The GSC medium is specific to *mycelial* growth.

The results were obtained after five days of incubation at 25° C. In accordance with the principle of selection by depletion, the greater the degree of dilution, the smaller the proportion and diversity of the micro-organisms which develop.

Second Isolation Stage (or First Purification):

The spores of a selected thallus are put back in suspension, and then undergo a decimal dilution (to $10^{-6}$). The spores are abstracted by means of a Pasteur pipette previously broken (to serve as a scraper) and sterilised by flame. The centre of the moulds is recovered (spores+mycelium) and then put back in suspension in sterilised water. Out of ten samples studied, eleven moulds were isolated in this way.

Third Isolation (Purification of the Strain):

After abstraction of the spores of the chosen strain, a seeding is performed, by a central injection using a broken Pasteur pipette, the aim being to obtain a single colony per Petri dish (pure culture). Three dishes per isolated mould were seeded, each of the dishes containing different culture mediums (the mediums GSC, PDA and YCG, another dextrose agar with chloramphenicol).

As the culture obtained is pure, the effect of the medium on the *mycelial* development is obvious. The incubation takes five to seven days at 25° C.

At the end of the third isolation, an observation with an immersion microscope is carried out for pre-identification of the isolated strains. The reproductive organs are observed, these being the primary distinguishing criteria for species in the classification.

A final isolation step, the seeding of slants, was then carried out.

Culture medium is poured into test tubes (9 ml of medium per tube). Each tube is closed off using cotton wool in order to protect the internal atmosphere from any external microbial contamination without for all that eliminating the flows of oxygen. The whole is sterilised by autoclave for 15 minutes at 120° C. At this temperature, the culture medium is liquid. On output from the autoclave, the tubes are inclined so that the agar comes up to ⅔. In less than one hour, the medium solidifies. Six slants were produced per mould:

one slant is put in reserve and kept cold;

one portion is for identification in a specialist outside laboratory in order to ascertain the isolated species accurately;

the other four are intended to be put back in suspension and decanted into cryogenic tubes, a form in which the strain is integrated into the library.

Eleven strains were purified. Seeding is carried out using a broken Pasteur pipette. The spores, abstracted by scraping from the Petri dishes in the third isolation phase, are put into suspension in the small amount of water present in the bottom of the tubes (condensation due to cooling of the medium). Spreading out is then easy and is performed in downward streaks.

A step of preservation and putting in the strain library is performed next.

Once the incubation week has passed, the spores and mycelium are recovered. To finish, a purity and cleanliness check is carried out in order to ensure the absence of contaminants. Production trials are initiated before final entry of the strain into the commercial range. If the trials are conclusive, the strain is finally integrated into the library: around fifty cryogenic tubes are prepared and put away; these serve as a reserve for the launch of future industrial productions.

The preparation of pure cultures requires not only the isolation of a given micro-organism from a natural population, but also the keeping of this micro-organism in an isolated atmosphere.

The micro-organisms are cultivated in small-sized volumes and receptacles (test tube, Erlenmeyer flask or Petri dish). These receptacles must be sterilised before the inoculation (UV, radiation, dry or wet heat) and then protected against external contamination.

The PDA medium is less selective than the GSC medium and less adapted to the growth of moulds; bacteria and yeast colonies will proliferate therein more easily.

Out of the eleven moulds isolated, ten were isolated after culture on a GSC medium and one after culture on a PDA medium.

A difference, both quantitative and qualitative, separates urban effluents from industrial effluents. In general terms, the specimens isolated from urban effluents do not appear in the other purification plants or else in a lesser amount.

There are now presented the main results of biodegradation of sludge by microfungi, obtained on a 5000 IE purification plant.

The activity of the microfungi was measured using two contact chambers 8 (or process tanks) provided with appropriate aeration, control and agitation equipment:

a process tank 8 into which the defined mixture (or cocktail) is injected;

a reference process tank 8 into which no *mycelial* cocktail is injected.

The two tanks are subjected to the same pH, temperature and aeration conditions. The flow to be treated is exactly the same; only the biomass differs since the selected *mycelial* species are situated in the process tank. Many species, combinations of species, and also essential parameters such as residence time and physico-chemical parameters were tested.

The residence time was also tested in order to evaluate the growth of exogenous and endogenous flora and to choose the optimum as regards degradation of the organic matter with the economic factor being taken into account (longer or shorter residence time necessitating more or less expensive installations). Amongst the physico-chemical parameters which make it possible to speed up the processes and therefore facilitate the correct functioning of the method, the inventor confirmed the significant effect of aeration on the development of the fungal cocktail in a mode encouraging its degrading capabilities.

Various tests were carried out in batch mode and in continuous mode on process tanks containing effluents charged with sludge in each of the tanks.

For operation in batch mode, samples were taken at time 0 in order to produce evaluations on the volume and quantity of the sludge: by way of example and non-exhaustively, the concentrations of suspended matter, dry volatile matter, dry matter, volatile matter, mineral matter, and also nitrogen and phosphorus, COD and the treated flows are quantified as the days pass. Biological analyses were carried out for the titration of the bacterial flora. After injection of the cocktail into the process tank (no injection into the reference tank), biological analyses were carried out for the titration of the bacterial and fungal flora. The titration gives accurate information about the *mycelial* population actually present.

For operation in continuous mode, the test is carried out for example according to the following protocol:

continuous inflow of effluents charged with so-called "sludge" matter into each of the tanks, and then continuous outflow of a given volume in order to maintain the required residence time (with the input and output flows being taken into account); in view of the volumes of the test installation, the continuous mode is set up using a daily feed (spread out according to a time slot) over a period of a few minutes per hour in succession to the daily extraction carried out over a period of a few minutes per hour;

taking of a sample upstream of the process tank in order to produce the evaluations on the volume and quantity of the sludge actually supplied into the *mycelial* digestion tank: by way of example and non-exhaustively, suspended matter and dry volatile matter, then dry matter, volatile matter, mineral matter, and also nitrogen and phosphorus, COD, etc. (with biological analyses for the titration of the bacterial flora);

starting of the bioreactor with production in situ of the selected species;

continuous injection of the cocktail (according to volume, the injection of the *mycelial* mixture can be sequential) into the process tank (no injection into the reference tank);

biological analyses for the titration of the bacterial and fungal flora of abstractions made from the bioreactor;

regular sample taking from the treated sludge output tank with requirement for both chemical and microbiologicalglobal global analyses.

The comparison is performed between the input and output, and also in parallel as a comparison with the reference.

The inventor noted degradations of the organic matter of the order of 20% to 40% on average, which correspond to a difference in quantity incoming into the system and a quantity outgoing from the system. The sludge treated with the microfungi in the contact chamber typically has the following concentrations.

|  | Sludge in the process tank at time 0, before the microfungus injection |
|---|---|
| Suspended matter | 7 to 25, in particular 7 to 12 g/l |
| Dry volatile matter | 4 to 20, in particular 4 to 8 g/l |
| Dry matter | 7 to 22, in particular 7 to 10 g/l |
| Mineral matter | 3 to 10, in particular 3 to 4 g/l |
| Volatile matter | 4 to 18, in particular 4 to 7 g/l |

Considering the whole of the preceding description, the invention has several notable advantages.

This is because the type and quantity of microfungi to be administered to the sludge can be selected in order to control the treatment as well as possible, in particular as a function of the parameters of the installation (environmental conditions for purification of the wastewater and the residual sludge coming therefrom, composition of the sludge, throughput of the installation, etc.).

The life cycle of microfungi, multicellular organisms, provides several significant differences compared with bacteria: growth slower and different from that of bacteria, enzymatic material for degradation of organic matter more complex and oriented towards a greater variety of substrates.

The selection of *mycelial* species coming from the endogenous medium combined, according to case, with other species known for their degrading capability, as well as determination of the physico-chemical conditions, make it possible to ensure the stability, adaptability and expression of the newly incorporated ecosystem (complex fungal mixture). Thus, this method makes it possible to exploit the advantageous enzymatic functions of exogenous ecosystems (fungal cocktails) and also, according to case, endogenous ecosystems (flora already present within the sludge).

A more thorough degradation of the purification plant sludge by certain microfungus "cocktails" with regard to the conventional process using the constituent bacteria and protozoa of the sludge is observed. The fraction of organic matter totally oxidised is in that case greater.

The energy consumption of this novel method is considerably reduced compared with the prior art: the oxygen supply needs of the microfungi represent approximately one third of the oxygen required by a bacterial population. In addition, the microfungi will use all the forms of oxygen supply available in order to optimise the degradation of the organic matter. The method is thus described as low-energy.

This method also makes it possible to control the discharges of pathogenic agents by reducing them, thanks to the "antibiotic" properties provided by the *mycelial* population. Certain *mycelial* species can also be chosen for their beneficial effect on plants, with useful applications for sludge intended for spreading on land: use will be made for example of strains known for their phytoprotective properties. In more general terms, the methods described previously offer great modularity and flexibility according to the microfungi chosen.

This method also non-limitatively allows an improvement in the drainability of the sludge, a pre-disinfection of the sludge, modifications of the C/N, C/P ratios, etc.

It should be noted that the performance of the treatment varies according to the operating conditions (selection of parameters allowing optimum performance to be achieved) but also according to the type of effluent, and therefore substrate, to be degraded. In addition, a number of possible pretreatments (applied to the flow partially or totally) make it possible to increase the performance significantly. Stressing the sludge before the *mycelial* treatment is possible via the use of enzymes, thermophilic catalysts, acidification, ozone, osmotic shocks, other oxidants and oxidation reagents. Thus decidedly superior performances can be achieved under specific conditions on given effluents.

The invention claimed is:

1. A method of reducing the volume of mainly urban purification plant sludge, comprising a step of treating the sludge with microfungi which are cultivated in parallel continuously, the culture of the microfungi and the treatment of the sludge being aerobic.

2. A method according to claim 1, wherein the time of treatment of the sludge with the microfungi is between 1 and 10 days, typically between 2 and 5 days.

3. A method according to claim 1, wherein the treatment with the microfungi is carried out at a pH on the order of 5.5 to 9, a temperature between 10° C. and 30° C., with agitation, and oxygenation on the order of 1 to 4 mg/l of dissolved oxygen.

4. A method according to claim 1, wherein a single strain or several different strains of microfungus are put in contact with the sludge.

5. A method according to claim 1, wherein the microfungi are chosen from amongst the genera PENICILLIUM, TRICHODERMA, FUSARIUM, PHOMA, MUCOR, GALACTOMYCES, ASPERGILLUS, BOTRYTIS, GEOMYCES and their mixtures.

6. A method according to claim 1, wherein the microfungi are chosen from amongst: PENICILLIUM roqueforti, PENICILLIUM camembertii, PENCILLUM chrysogenum, PENICILLIUM atramentosum, TRICHODERMA viride, TRICHODERMA Koningii, TRICHODERMA reesei, MUCOR hiemalis, MUCOR mucedo, MUCOR racemosus, MUCOR circinelloides, MUCOR fuscus, MUCOR plumbeus, GALACTOMYCES geotricum, ASPERGILLUS phoenicis, ASPERGLLLUS niger, ASPERGILLUS ficuum, FUSARIUM equisetii, GEOTRICUM candidum, PHOMA glomerata, BOTRYTIS Cinerea, GEOMYCES pannorum and their mixtures.

7. A method according to claim 1, wherein the sludge is treated continuously.

8. A method according to claim 1, wherein the microfungi are injected at a rate on the order of 0.01% to 10%, typically of the order of 2% to 5%, of the volume of sludge to be treated per day.

9. A method according to claim 1, wherein the sludge is treated discontinuously.

10. A method according to claim 9, wherein the microfungi are injected at a rate on the order of 0.01% to 15%, of the volume of sludge to be treated per day.

11. A method according to claim 1, wherein the microfungi are at least partly endogenous, extracted from the sludge not yet treated with the microfungi.

12. A method according to claim 1, wherein the amount of dry matter of the sludge treated with the microfungi is reduced by approximately 10% to 50%, compared with that of the untreated sludge.

13. A method according to claim 1, wherein it comprises a step of membrane filtration of the sludge treated with the microfungi.

14. A method of treating mainly urban water in a purification plant, wherein it comprises the following successive steps:
   physical and/or biological treatment of the wastewater, leading to the production of sludge conveyed into at least one mixed-treatment tank (18);
   if need be, activation of the sludge in said tank (18);
   biological treatment with microfungi and with help of membrane filtration system (19), of at least some of the sludge, if need be activated, in the mixed-treatment tank (18), using a method according to claim 13.

15. An installation for treating mainly urban purification plant effluents, intended to implement a method according to claim 13, wherein it comprises:
   a mixed-treatment tank (18) containing purification sludge to be treated, intended for the degradation of at least some of the sludge by the microfungi, the mixed-treatment tank (18) comprising membrane filtration means (19, 31);
   in parallel with the mixed-treatment tank, a bioreactor (28) for continuous microfungus culture.

16. A method of treating mainly urban water in a purification plant, wherein it comprises the following successive steps:
   physical and/or biological treatment of the wastewater, leading to the production of sludge conveyed into at least one initial-treatment tank (3);
   if need be, activation of the sludge in said tank (3);
   if need be, clarification of the activated sludge;
   biological treatment with microfungi of at least some of the sludge, if need be activated, in at least one biological contact chamber (8) situated downstream of the initial-treatment tank (3), using a method according to claim 1.

17. A method according to claim 1, wherein it comprises a step of treating the sludge with at least one oxidizing agent injected on-line or in a pretreatment tank.

18. A method according to claim 17, wherein the oxidizing treatment precedes the biological treatment with microfungi.

19. A method according to claim 17, wherein the oxidizing treatment has a duration less than three hours.

20. A method according to claim 17, wherein the oxidizing agent comprises $H_2O_2$ and a ferrous or ferric salt.

21. A method according to claim 20, wherein the oxidizing agent is Fenton's reagent.

22. A method according to claim 17, wherein the oxidizing agent comprises 0.001 to 0.1 g $H_2O_2$/g suspended matter of the initial sludge before treatment with the microfungi and 0.0001 to 0.01 g $FeSO_4$/g initial suspended matter.

23. A method according to claim 1, wherein it comprises a step of treating the sludge with at least one antibiotic.

24. A method according to claim 23, wherein the antibiotic is added to the sludge before or at the same time as the microfungi.

25. An installation for treating mainly urban purification plant effluents, intended to implement a method according to claim 1, wherein it comprises:
- an initial-treatment tank (3) containing purification sludge;
- downstream of the initial-treatment tank, at least one biological contact chamber (8) intended for the aerobic degradation of at least some of the sludge by the microfungi;
- upstream of the biological contact chamber, a bioreactor (9) for continuous aerobic microfungus culture.

26. An installation according to claim 25, wherein the bioreactor comprises:
- means of input of nutriments and of an inoculum to be cultivated;
- means of homogeneous distribution of the microfungi in the bioreactor;
- means (10) of transferring cultivated microfungi to the contact chamber (8) or the mixed-treatment tank (18);
- filtration of the air circulating in the reactor.

27. An installation according to claim 25, wherein the contact chamber comprises means (10) of input of the microfungi, means (7, 7a) of input of the sludge, agitation means (14), aeration means (13), means (17, 17a) of removing the treated sludge, and means of controlling the input and output flow rates of the sludge and microfungi, the pH and the temperature.

28. An installation according to claim 25, wherein it comprises an oxidizing agent tank or means of injecting the oxidizing agent on-line upstream of the contact chamber.

* * * * *

UNITED STATES PATENT AND TRADEMARK OFFICE
CERTIFICATE OF CORRECTION

| | |
|---|---|
| PATENT NO. | : 7,270,751 B2 |
| APPLICATION NO. | : 10/507578 |
| DATED | : September 18, 2007 |
| INVENTOR(S) | : Fleury |

Page 1 of 1

It is certified that error appears in the above-identified patent and that said Letters Patent is hereby corrected as shown below:

Column 17

Line 63, please delete ", typically"
Line 64, please delete "of the order of 2% to 5%"

Signed and Sealed this

Eighth Day of April, 2008

JON W. DUDAS
*Director of the United States Patent and Trademark Office*